(12) United States Patent
Ganapathy et al.

(10) Patent No.: US 10,021,637 B2
(45) Date of Patent: Jul. 10, 2018

(54) COMMUNICATION SYSTEM

(71) Applicants: Suresh Ganapathy, Tokyo (JP);
Jagdeep Singh Ahluwalia, Tokyo (JP);
Neeraj Gupta, Tokyo (JP); Kenji Kawaguchi, Tokyo (JP)

(72) Inventors: Suresh Ganapathy, Tokyo (JP);
Jagdeep Singh Ahluwalia, Tokyo (JP);
Neeraj Gupta, Tokyo (JP); Kenji Kawaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 154 days.

(21) Appl. No.: 14/362,586

(22) PCT Filed: Nov. 15, 2012

(86) PCT No.: PCT/JP2012/080251
§ 371 (c)(1),
(2) Date: Jun. 3, 2014

(87) PCT Pub. No.: WO2013/084721
PCT Pub. Date: Jun. 13, 2013

(65) Prior Publication Data
US 2014/0341101 A1    Nov. 20, 2014

(30) Foreign Application Priority Data
Dec. 6, 2011    (GB) .................................. 1120958.2

(51) Int. Cl.
*H04W 52/02*    (2009.01)
*H04W 88/08*    (2009.01)
(Continued)

(52) U.S. Cl.
CPC ....... *H04W 52/0206* (2013.01); *H04W 88/08* (2013.01); *H04W 88/10* (2013.01);
(Continued)

(58) Field of Classification Search
CPC .. Y02B 60/50; H04W 36/08; H04W 36/0055; H04W 52/0206; H04W 52/0216;
(Continued)

(56) References Cited

U.S. PATENT DOCUMENTS 8,009,635 B2    8/2011    Fashandi et al.
8,892,089 B2    11/2014   Nitta et al.
(Continued)

FOREIGN PATENT DOCUMENTS

CN    101202974 A    6/2008
CN    101965038 A    2/2011
(Continued)

OTHER PUBLICATIONS

Japanese Office Action dated Apr. 22, 2015 with a partial English translation.
(Continued)

*Primary Examiner* — Marsha D. Banks Harold
*Assistant Examiner* — Dharmesh Patel
(74) *Attorney, Agent, or Firm* — McGinn IP Law Group, PLLC.

(57)    ABSTRACT

A communication system in which at least one of the first and second base station modules of a dual mode access point is configured to provide information, as regards to its operating mode, to the other base station module. In one embodiment, the operating mode information is provided via an internal interface coupling the first and second base station modules.

30 Claims, 6 Drawing Sheets

(51) Int. Cl.
*H04W 88/10* (2009.01)
*H04W 92/20* (2009.01)

(52) U.S. Cl.
CPC ............. *H04W 92/20* (2013.01); *Y02D 70/00* (2018.01); *Y02D 70/1224* (2018.01); *Y02D 70/1242* (2018.01); *Y02D 70/1262* (2018.01); *Y02D 70/146* (2018.01)

(58) Field of Classification Search
CPC . H04W 72/082; H04W 84/045; H04W 88/08; H04W 88/10; H04W 92/20
See application file for complete search history.

(56) References Cited

U.S. PATENT DOCUMENTS

| | | | |
|---|---|---|---|
| 2007/0058588 A1 | 3/2007 | Fashandi et al. | |
| 2009/0253426 A1 | 10/2009 | Qui et al. | |
| 2010/0035647 A1 | 2/2010 | Gholmieh et al. | |
| 2010/0169412 A1* | 7/2010 | Gupta | H04L 63/102 709/203 |
| 2010/0190533 A1* | 7/2010 | Black | H04W 24/04 455/571 |
| 2010/0279689 A1 | 11/2010 | Tinnakornsrisuohap et al. | |
| 2011/0044284 A1 | 2/2011 | Voltolina et al. | |
| 2011/0170466 A1* | 7/2011 | Kwun | H04W 52/0235 370/311 |
| 2011/0275362 A1 | 11/2011 | Nitta et al. | |
| 2011/0287756 A1 | 11/2011 | Cho et al. | |
| 2011/0310791 A1* | 12/2011 | Prakash | H04W 24/02 370/315 |
| 2012/0088531 A1* | 4/2012 | Bonneville | H04W 52/0206 455/500 |
| 2012/0113882 A1 | 5/2012 | Zhao et al. | |
| 2012/0207128 A1* | 8/2012 | Wang | H04W 36/0027 370/331 |
| 2013/0095842 A1 | 4/2013 | Jia et al. | |

FOREIGN PATENT DOCUMENTS

| | | |
|---|---|---|
| CN | 102083145 A | 6/2011 |
| CN | 102111816 A | 6/2011 |
| GB | 2483755 A | 3/2012 |
| JP | 2010-098494 A | 4/2010 |
| JP | 2011-135147 A | 7/2011 |
| JP | 2011-239010 A | 11/2011 |
| WO | WO 2011/009415 A1 | 1/2011 |
| WO | WO 2011/125849 A1 | 10/2011 |
| WO | WO 2011/158663 A1 | 12/2011 |

OTHER PUBLICATIONS

Korean Office Action dated May 8, 2015 with a partial English translation.
International Search Report in PCT/JP2012/080251 dated Mar. 1, 2013 (English Translation Thereof).
Great Britain Search Report dated Dec. 28, 2011.
Mitsubishi Electric, "Dynamic Setup of HNBs for Energy Savings and Interference Reduction", 3GPP TSG RAN WG3 Meeting #59bis, R3-080658, Shenzen, China, Mar. 31-Apr. 3, 2008.
3 GPPP TS 36.331 v10.3.0 (Sep. 2011) 3rd Generation Partnership Project; Technical Specification Group Radio Access Network; Evolved Universal Terrestrial Radio Access (E-UTRA);Radio Resource Control (RRC); Protocol specification (Release 10).
3 GPP TS 36.413 v10.3.0 (Sep. 2011) 3'd Generation Partnership Project; Technical Specification Group Radio Access Network; Evolved Universal Terrestrial Radio Access Network (E-UTRAN);S1 Application Protocol (S1AP) (Release 10).
3 GPP TS 36.423 v10.3.0 (Sep. 2011) 3rd Generation Partnership Project; Technical Specification Group Radio Access Network; Evolved Universal Terrestrial Radio Access Network (E-UTRAN);X2 application protocol (X2AP) (Release 10).
3 GPP TS 48.018 v10.3.0 (Sep. 2011) 3rd Generation Partnership Project; Technical Specification Group GSM/EDGE Radio Access Network; General Packet Radio Service (GPRS);Base Station System (BSS)—Serving GPRS Support Node (SGSN);BSS GPRS Protocol (BSSGP)(Release 10).
Chinese Office Action, dated Mar. 24, 2017, in Chinese Application No. 201280060421.2 and English Translation therof.
Chinese Office Action, dated Oct. 26, 2017, in Chinese Application No. 201280060421.2 and English Translation thereof.

* cited by examiner

COMMUNICATION SYSTEM

TECHNICAL FIELD

The present invention relates to mobile telecommunication networks and to parts thereof, particularly but not exclusively, networks operating according to the 3rd Generation Partnership Project (3GPP) standards or equivalents or derivatives thereof. The invention has particular although not exclusive relevance to the energy saving for home base stations in these networks.

BACKGROUND ART

Under the 3GPP standards, a NodeB (or an eNB in LTE (i.e. Long Term Evolution)) is the base station via which mobile devices connect to the core network and which defines a cell of the network. Home base stations (HNB) provide short range 3G radiofrequency (RF) coverage, and are sometimes referred to as a femto access point (FAP). Where the home base station is operating in accordance with the LTE standards, the HNB is commonly referred to as an HeNB. Some base stations, sometimes referred to as HNB/HeNB, can operate in accordance with both the 3G and LTE standards, and therefore define a dual mode femtocell. The HNB/HeNB base station may also sometimes be referred to as a dual femto access point (FAP).

The HNB or HeNB provides radio coverage (for example, 3G, 4G and/or WiMAX) within the home, small or medium enterprise, shopping malls, etc. and typically connects to the core network via a suitable residential gateway RG and public or corporate broadband (BB) access network (for example via an ADSL link to the Internet). The HNB or HeNB is given an IP address by the local network to which it is connected, and the HNB or HeNB provides this IP address to the mobile telephone operator network so that it can reserve appropriate resources for the HNB or HeNB through the broadband access network.

During operation in a normal operation mode or normal state, the HNB or HeNB enables users of a User Equipment (UE) to communicate with other such users via one of a number of the base stations (eNodeB, eNB) and a core network.

In a connected or active state or mode, a UE is registered with the network and has an RRC (Radio Resource Control) connection with a base station, so that the network can identify which cell the UE belongs to and can transmit data to and receive data from the UE. In LTE, in the active state or mode, the Handover procedure allows UEs to have service continuity whilst moving within the Intra LTE system (Intra RAT and Inter Frequency) and towards other RATS (Radio Access Technologies).

A UE also has a power conservation or idle state or mode in which, typically, the UE is not transmitting or receiving data, and no context about the UE is stored by the base station. In the idle state, the location of the UE is known only (to the MME (Mobility Management Entity) in 3GPP) at the granularity of a Tracking Area (TA) comprising a cluster or group of base station cells. When in the idle state, a UE selects and reselects cells according to the parameters broadcast by the base station in the BCH (Broadcast Channel), with a frequency given by a Tracking Area Update Timer Value, and the base station is not aware of the cell selections/reselections made by the UE.

During the normal operation mode, the HNB or HeNB usually periodically broadcasts a downlink transmission comprising reference signals and system information, for instance both the Pilot and the Broadcast Channels, to signal its presence to UEs.

This broadcast by the HNB or HeNB consumes a relatively significant amount of energy and also results in human exposure to radiation. If there is no UE in the coverage range of a HNB or HeNB, this broadcast may be seen as an unnecessary waste of energy and an unnecessary human exposure to radiation. Additionally, the HNB or HeNB, by continuously transmitting the Pilot and Broadcast Channels, may cause interference with a neighbouring HNB or HeNB.

In order to mitigate these drawbacks, a HNB or a HeNB can enter an energy saving mode or state in which the amount of energy consumption by the HNBs or HeNBs, as well as the human exposure to radiation and interference caused to neighbouring HNB or HeNB, are reduced.

To this end, in the normal operation mode, each HNB or HeNB checks if there are any UEs in the idle or connected state in its cell. In order to allow the HNB or HeNB to perform this check, the periodic Tracking Area Update Timer Value may be sent to the HNB or HeNB through the Operations and Management (O&M) system. If no UE responds by performing the Tracking Area Update, the HNB or HeNB can assume that there is no idle state UE present in the cell. The HNB or HeNB may also perform a dummy paging for an idle state UE. If the HNB or HeNB does not receive a paging response from a UE, the HNB or HeNB can assume that there is no idle state UE present in the cell.

SUMMARY OF INVENTION

Technical Problem

If no connected or idle state UE is present in the cell for certain duration of time (as determined by an Idle Timer), the HNB or HeNB moves to the energy saving mode, in which it stops all downlink transmissions.

However, if an energy saving mode timer expires or if the HNB or HeNB receives a paging or any other message on its S1 interface or TR069 interface (using protocol messages defined in TR 196 Data Model from Broad Band Forum) or if the HNB or HeNB detects an uplink transmission from a UE in a neighbouring cell, then the HNB or HeNB moves back to the normal operation mode, in which it starts downlink transmission again.

In dual mode cells, both the baseband and the radiofrequency processing hardware blocks of the HeNB are independent from the baseband and the radiofrequency processing hardware blocks of the HNB. The HeNB and the HNB therefore operate independently of each other in terms of entering and exiting the energy saving mode. For instance, when a UE that is in first base station needs to be handed over or redirected to the second base station, an indication needs to be sent by the first base station to wake up the second. As a result, a HNB or HeNB in the energy saving mode might not be able to receive the UE handover request, and the call might need to be handed over to a macro cell in which the dual mode femto cell operates. Furthermore the femto cell operator may not also manage the macro cell network and the handing over of the call to a macro cell may result in a loss in revenue.

Solution to Problem

Aspects of the present invention address or at least ameliorate the above issue.

According to one aspect, the invention provides a communications apparatus comprising: a first base station module for providing wireless connectivity to a communications network to one or more mobile communications devices within range of the first base station module; a second base station module for providing wireless connectivity to a communications network to one or more mobile communications devices within range of the second base station module; an interface for coupling the first base station module and the second base station module; wherein each base station module has a normal operating mode and an energy saving operating mode, and wherein at least one of the first and second base station modules is configured to provide operating mode information to the other one of the first and second base station modules via said interface.

At least one of the first and second base station modules may be configured to inform the other one of the first and second base station modules when it changes its operating mode. At least one of the first and second base station modules may provide operating mode information to the other one of the first and second base station modules, to control the operating mode of the other one of the first and second base station modules.

At least one of the first and second base station modules may be configured to provide operating mode information to the other one of the first and second base station modules when the said other one of the first and second base station modules is in the energy saving operating mode, to trigger the exit of the said other one of the first and second base station modules from the energy saving operating mode, and its entrance into the normal operating mode. At least one of the first and second base station modules may provide to the other one of the first and second base station modules a message comprising at least one of a Circuit Switch Fall Back (CSFB) message or a Communication Redirection message.

At least one of the first and second base station modules may provide to the other one of the first and second base station modules a message comprising information about at least one of an energy saving operating mode timer and an energy saving operating mode threshold. At least one of the first and second base station modules may provide to the other one of the first and second base station modules a message comprising information about a trigger for its exit from the energy saving operating mode.

At least one of the first and second base station modules may be configured to change its operating mode as a function of operating mode information provided by the other one of the first and second base station modules.

The first base station module and the second base station module may be mounted within a common housing. The communications apparatus may be a dual mode femto access point.

At least one of the first and second base station modules may comprise a HNB and the other of the first and second base station modules may comprise a HeNB.

The invention also provides a system for use in a telecommunications network, comprising one or more mobile communications devices and a communications apparatus according to some aspects of the invention as stated above.

The invention also provides a mobile communications device for use with a communications apparatus comprising: a first base station module for providing wireless connectivity to a communications network to one or more mobile communications devices within range of the first base station module; a second base station module for providing wireless connectivity to a communications network to one or more mobile communications devices within range of the second base station module; an interface for coupling the first base station module and the second base station module; wherein each base station module has a normal operating mode and an energy saving operating mode, and wherein at least one of the first and second base station modules is configured to provide operating mode information to the other one of the first and second base station modules, and wherein the mobile communications device is arranged to communicate a communications network via one of the first and second base station modules of the communications apparatus.

The invention also provides a method, performed in a telecommunications network, for facilitating at least one of an entrance into and an exit from an energy saving operating mode of at least one of two base station modules of a communications apparatus, the method comprising providing to at least one of said two base station modules, over an interface coupling the two base station modules, operating mode information indicating to at least one of said two base station modules whether the other of said two base station modules is in the energy saving operating mode or not.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

BRIEF DESCRIPTION OF THE DRAWINGS

Embodiments of the invention will now be described, by way of example, with reference to the accompanying drawings, in which.

DESCRIPTION OF EMBODIMENTS

Although for efficiency of understanding for those of skill in the art, embodiments and implementations of the invention will be described in detail in the context of a 3G system (UMTS, LTE), the principles of the invention can be applied to other systems (such as WiMAX) in which mobile devices or User Equipment (UE) communicate with one of several base stations with the corresponding elements of the system changed as required.

Overview

Figure 1:
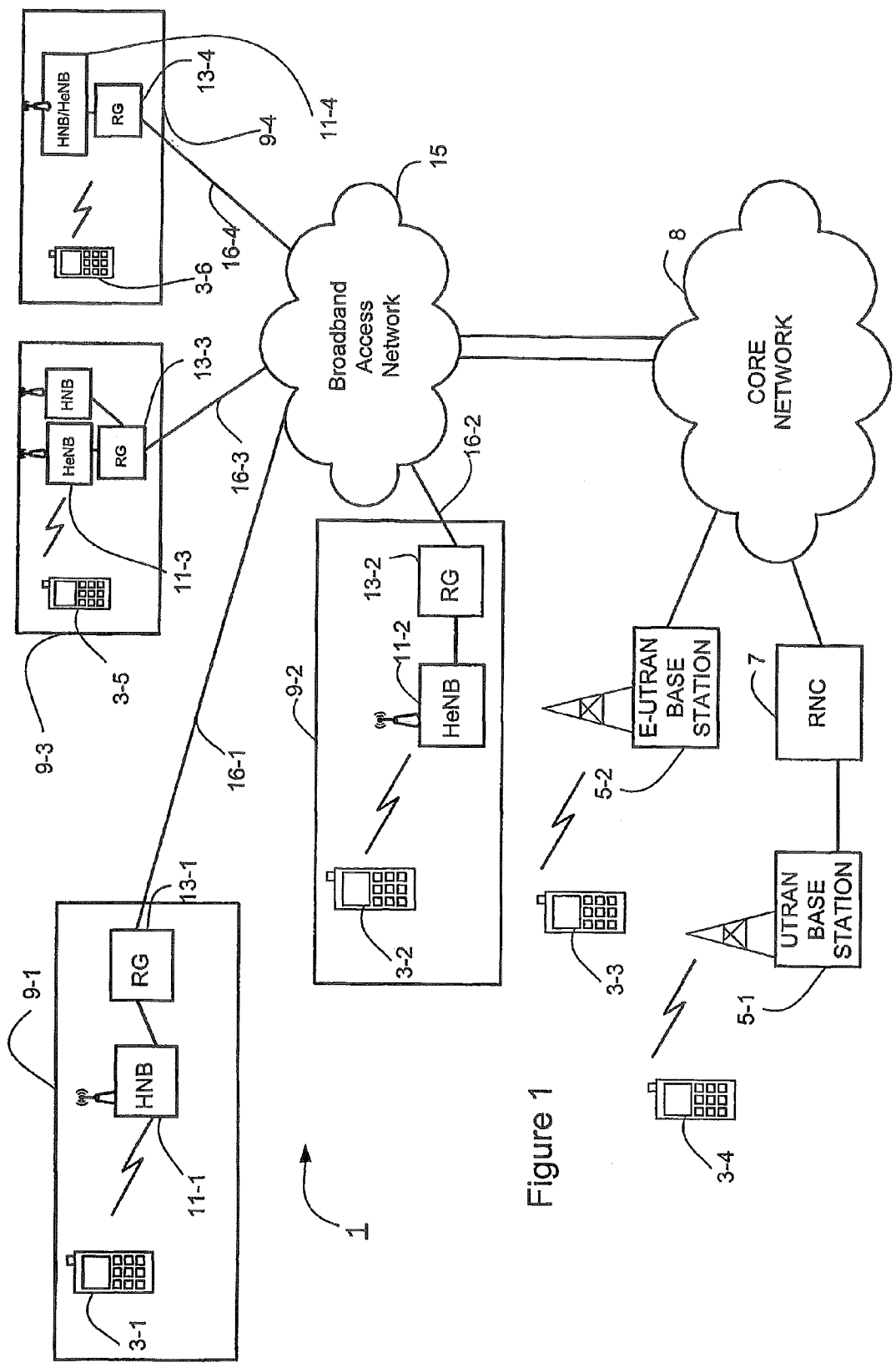
FIG. 1 schematically illustrates a mobile telecommunication system.

FIG. 1 schematically illustrates a mobile (cellular) telecommunication system 1 in which users of User Equipments (UE) such as mobile telephones 3-1 to 3-6 can communicate with other users via different access nodes. In particular, mobile telephones 3 (or other user equipment UE) can make connections with the mobile telephone core network 8 directly via a Universal Terrestrial Radio Access Network (UTRAN) base station 5-1 and associated Radio Network Controller (RNC) 7 or an evolved UTRAN (E-UTRAN) base station 5-2. Mobile telephones 3 can also connect to the mobile telephone core network 8 using a 'home' base station (HNB) provided in a user's commercial or private residence 9. Each HNB or HeNB 11 (i.e. HNB 11-1, HeNB 11-2, HNB/HeNB 11-3 and HNB/HeNB 11-4) is coupled, by a residential gateway 13 and a broadband access network 15 (conforming to the BroadBand Forum, BBF), to the mobile telephone core telephone network 8.

In the example illustrated in FIG. 1, the mobile telephone 3-1 is connected to the core network 8 via the HNB 11-1; the mobile telephone 3-2 is connected to the core network 8 via HeNB 11-2; the mobile telephone 3-3 is connected to the core network 8 via E-UTRAN base station 5-2; the mobile telephone 3-4 is connected to the core network 8 via UTRAN base station 5-1, the mobile telephone 3-5 is connected to the core network 8 via the dual mode base HNB/HeNB or dual femto access point 11-3; and the mobile telephone 3-6 is connected to the core network 8 via the dual mode base HNB/HeNB or dual FAP 11-4.

In the example of FIG. 1, the residential gateways 13 connect to the broadband access network 15 via an ADSL or cable connection 16 and the HNBs and HeNBs are programmed with the IP address of a security gateway (not shown) within the core network 8 so that the HNBs and HeNBs initially connect to the preprogrammed security gateway. In this embodiment, the residential gateway 13 of a user's commercial or private residence 9 assigns the HNB or HeNB 11 a local IP address in the broadband access network 15, which the HNB or HeNB 11 will use in its communications with the core network 8.

Advantageously, the HNB and HeNB of the dual FAP 11-3, 11-4 is provided with an interface module. The interface module advantageously allows the exchange of information between the HNB and HeNB of the dual FAP. Accordingly, the HNB and HeNB are able to advantageously exchange operation mode information, and to coordinate their entrance into and/or their exit from an energy saving mode, using the provided information. The HeNB and the HNB therefore do not operate independently of each other in terms of the entering and exiting the energy saving mode, as each of the HNB and HeNB might use the information provided for entering and/or exiting from the energy saving mode.

Home Base Station

Figure 2:
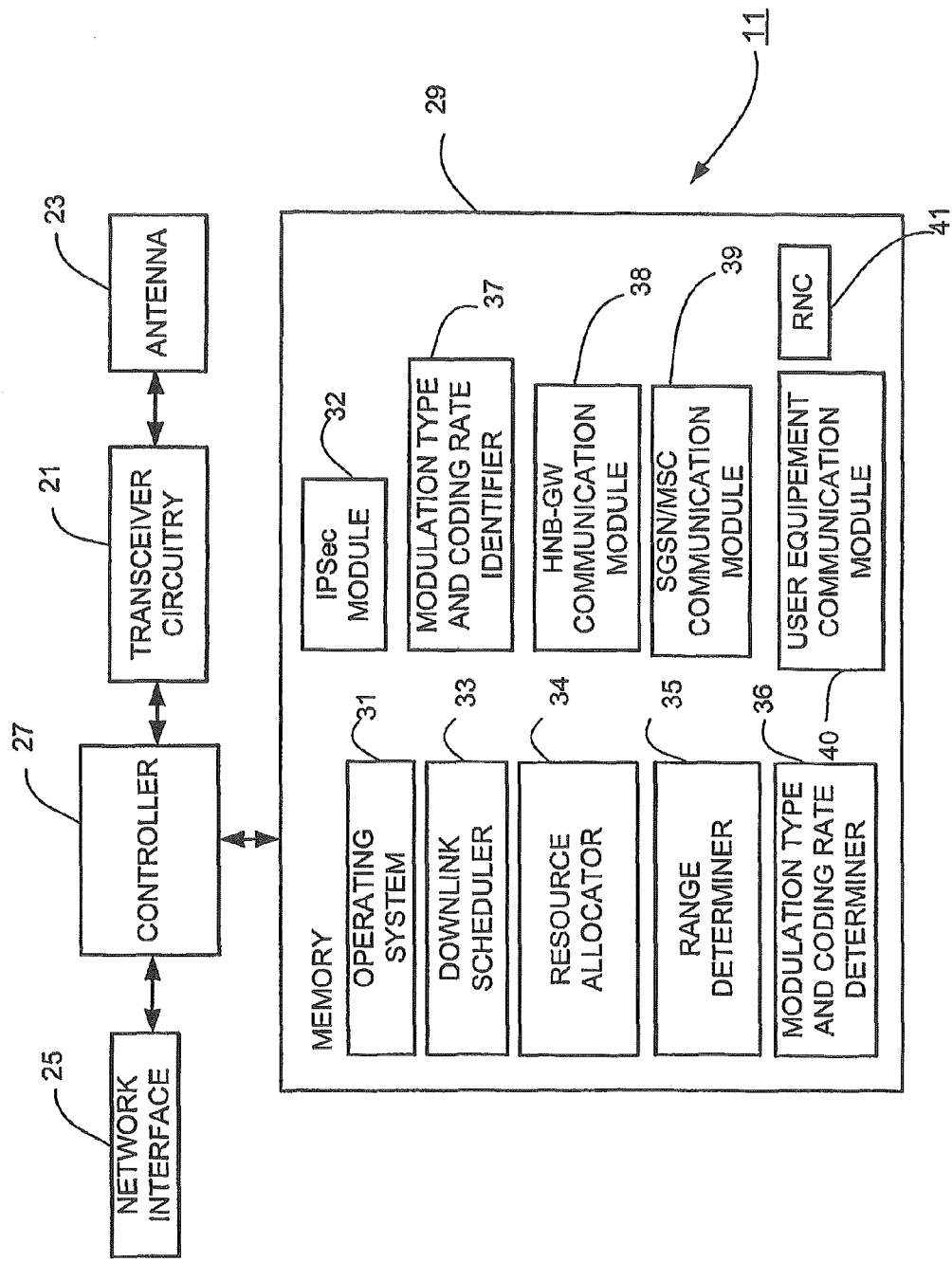
FIG. 2 shows a block diagram illustrating the main components of a base station, that is a home NodeB communications node in a 3G system.

FIG. 2 shows a block diagram illustrating the main components of a HNB base station 11-1 or of a HNB part of a dual FAP 11-3 or 11-4 in the 3G system 1. As shown in FIG. 2, each HNB 11 comprises at least a transceiver circuit 21 to transmit signals to and to receive signals from the UEs 3 via one or more antennae 23 and to transmit signals to and to receive signals from the telephone network via a network interface 25. The transceiver circuit 21 is controlled by a controller 27 in accordance with software stored in memory 29. The software includes, among other things, an operating system 31, an IPSec module 32, a downlink scheduler 33 to schedule user data packets to be transmitted by the transceiver circuit 21 in communications with the UEs 3, a resource allocator 34 to allocate frequency resources for use by the UEs 3 for transmitting their uplink data to the base station. In this example, the software further includes a range determiner 35 to determine the range of a UE from the base station, a modulation type and coding rate (MCS) determiner 36 to determine the modulation and coding rate to be used, a modulation type and coding rate scheme (MCS) identifier 37 to identify to a UE 3 the MCS of a control channel upon which the base station is attempting to communicate with the UE 3, an HNB-GW communication module 38; an SGSN/MSC communication module 39, a user equipment communication module 40. The HNB 11 further includes radio resource management functions provided by a standard Radio Network Controller RNC 41.

The HeNB 11-2 and the HeNB part of the dual FAP 11-3 and 11-4 shown in FIG. 1 have similar components to those shown in FIG. 2. The main difference may be that there may not be an HNB-GW communication module 38 and instead of an SGSN/MSC communication module 39, there may be an MME communication module. Also, the HeNB do not communicate using the HNBAP protocol, but using the E-UTRAN protocols such as the S1AP protocol.

User Equipment

Figure 3:
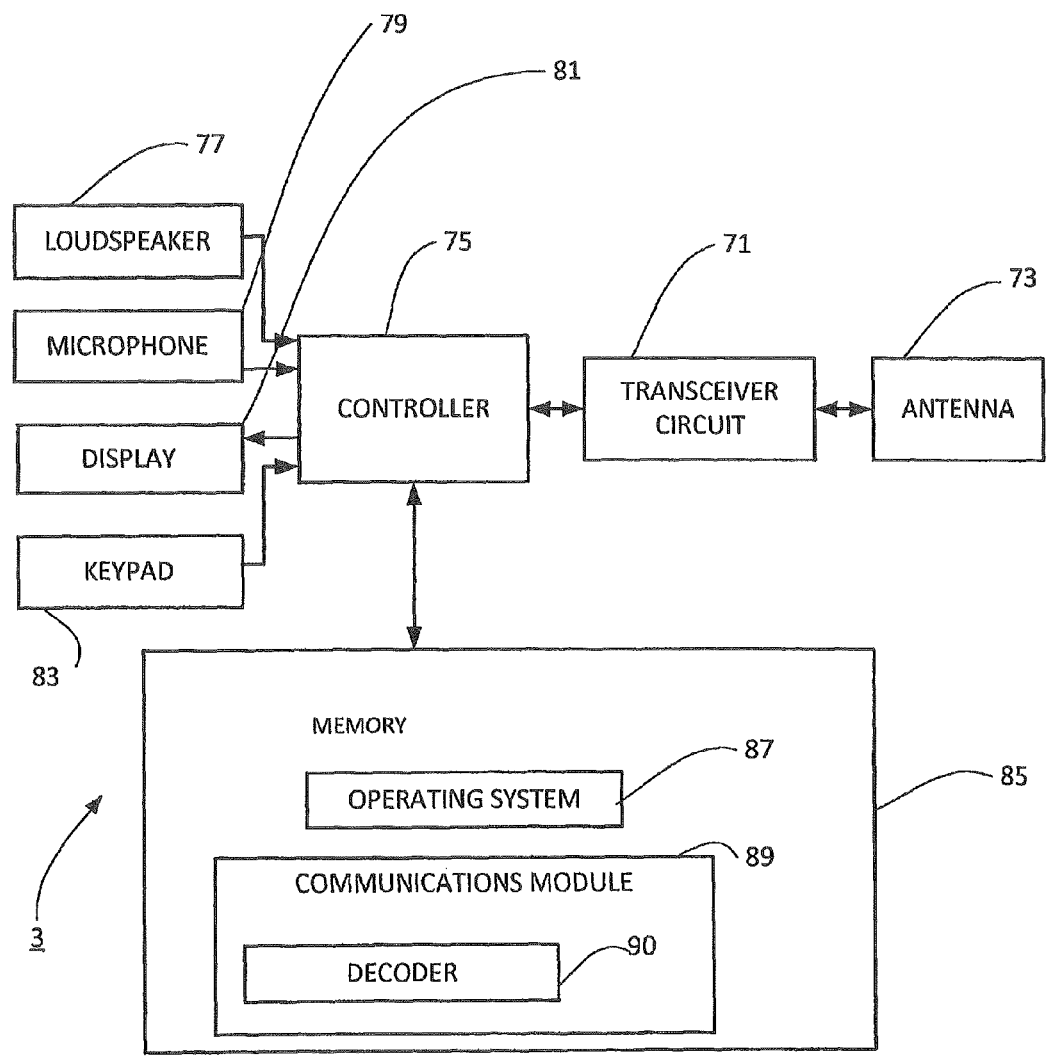
FIG. 3 illustrates schematically the main components of a UE of the telecommunication system of FIG. 1.

FIG. 3 illustrates schematically the main components of a UE 3 shown in FIG. 1. As shown in FIG. 3, each UE 3 includes a transceiver circuit 71 to transmit signals to and to receive signals from the base stations 5 or 11 via one or more antennae 73. As shown, the UE 3 also includes a controller 75 to control the operation of the UE 3. The controller 75 is connected to the transceiver circuit 71 and to a user interface having, in this example, a loudspeaker 77, a microphone 79, a display 81, and a keypad 83. The controller 75 operates in accordance with software instructions stored within memory 85. As shown, these software instructions include, among other things, an operating system 87 and a communications module 89 having a decoder to perform decoding on a downlink (DL) control channel Dual FAP Architectures FIGS. 4a and 4b schematically illustrate two examples of architectures for the dual FAP 11-3 and 11-4 of FIG. 1.

Figure 4A:
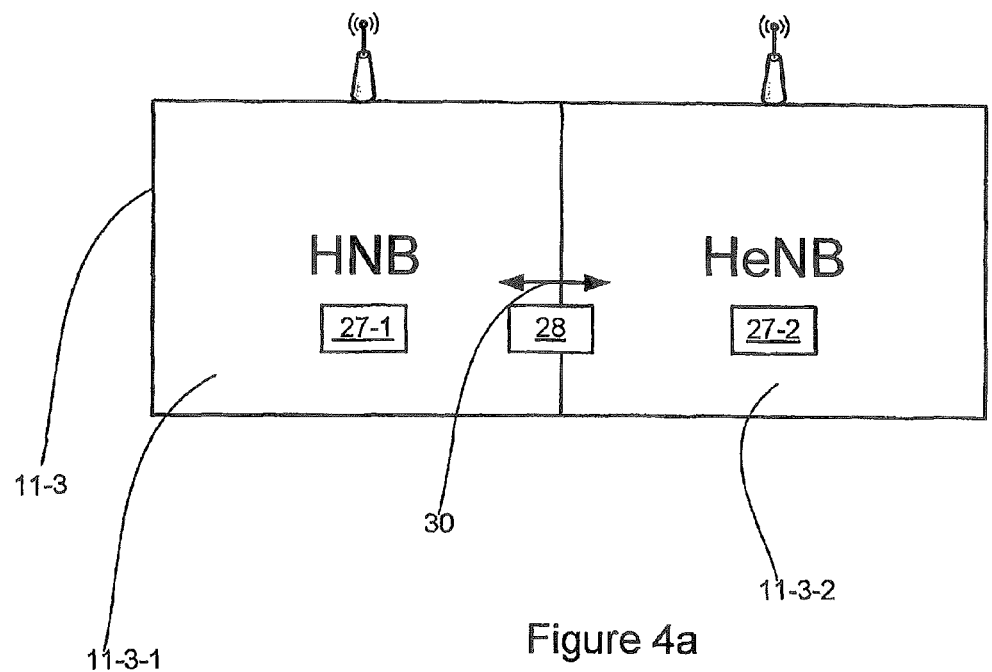
FIG. 4a schematically illustrates an example of an architecture for a dual mode FAP of the telecommunication system of FIG. 1.

FIG. 4a schematically illustrates an example of an architecture for the dual FAP 11-3 of FIG. 1, where the dual FAP comprises separate controller modules 27-1 and 27-2, i.e. there is a controller module 27 for each of the HNB and the HeNB. In this example, each separate controller modules 27-1 and 27-2 may be considered as part of separate baseband chipset 11-3-1 and 11-3-2 respectively.

Figure 4B:
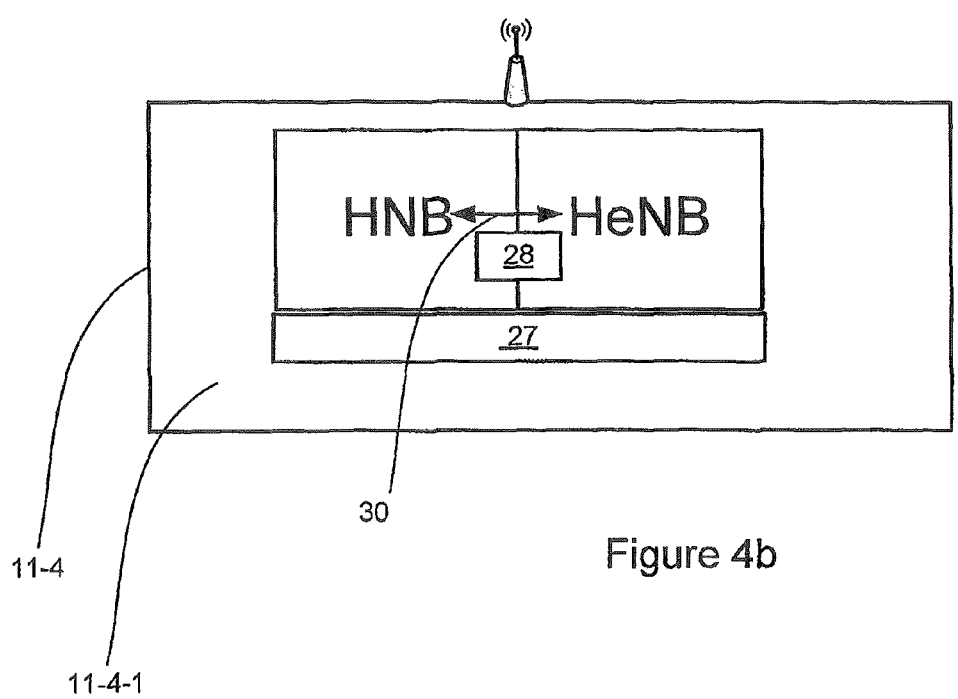
FIG. 4b schematically illustrates another example of an architecture for a dual mode FAP of the telecommunication system of FIG. 1.

FIG. 4b schematically illustrates an example of an architecture for the dual FAP 11-4 of FIG. 1, where the dual FAP comprises a single controller module 27, i.e. there is a single controller module 27 for both the HNB and the HeNB. In this example, the controller module 27 can be considered as part of a single baseband chipset 11-4-1 for both the HNB and the HeNB. In both cases, the two home base stations HNB and HeNB of the dual FAP are connected by an interface module 28, sometimes referred to as an internal interface.

In FIGS. 4a, 4b and 4c, the first base station module and the second base station module are mounted within a common housing as shown by arrows 11-3 and 11-4.

Operation

Four examples of methods used in coordinating at least one of an entrance into and an exit from an energy saving mode, between at least two home base stations of a multi-mode femto access point in a telecommunications network, will now be described. Although for efficiency of understanding for those skilled in the art, the invention will be described in detail in the context of two home base stations (HNB and HeNB) of a dual FAP, the principles described herein can be applied to a multimode FAP comprising more than two home base stations with the corresponding elements of the system changed as required.

Figure 5:
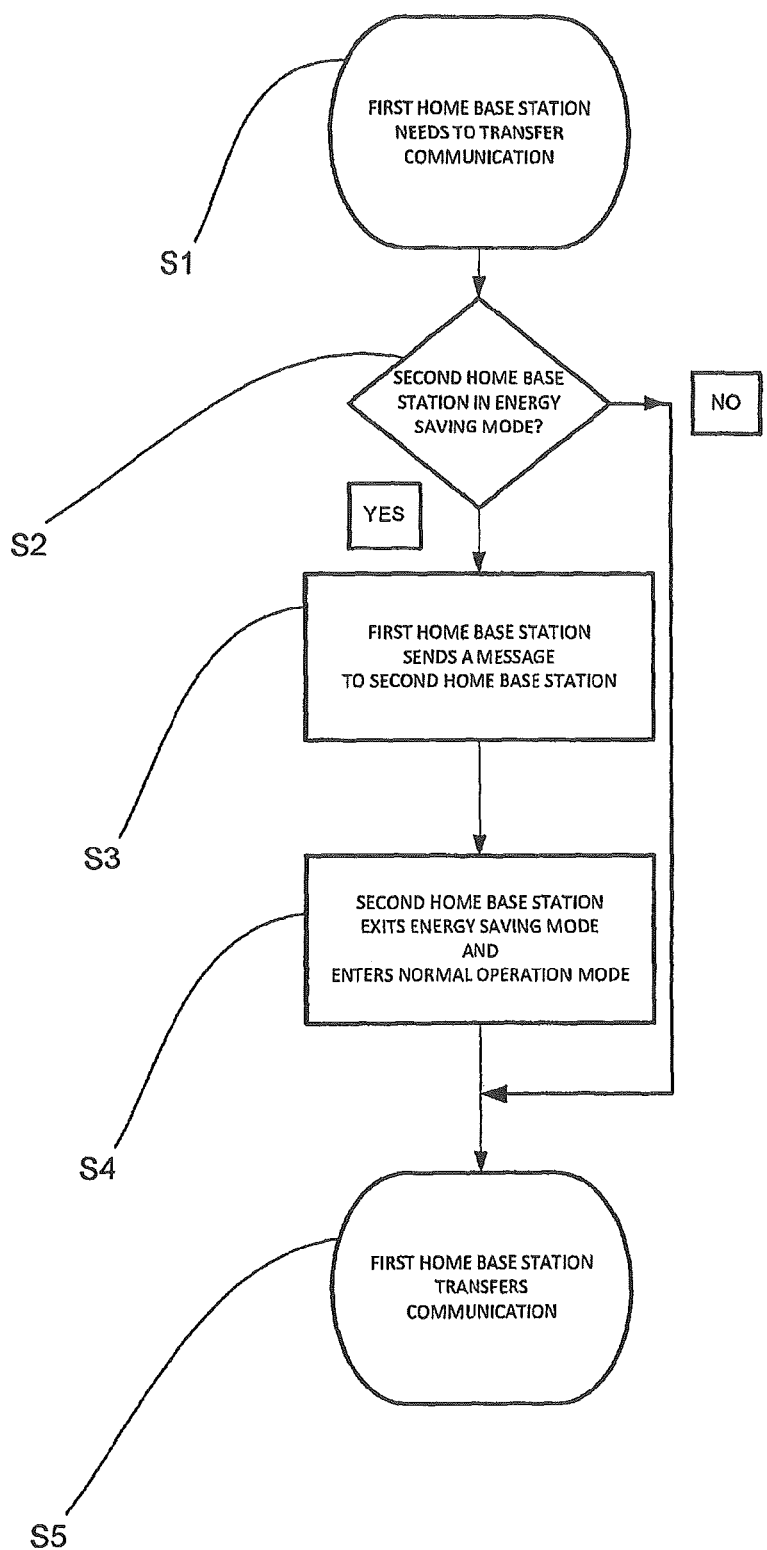
FIG. 5 is a diagram illustrating an exemplary method performed by the telecommunication system of FIG. 1.

A first example is described with reference to FIGS. 4a and 4b. In some aspects of the invention, coordination is provided for at least one of the entering into and the exiting from the energy saving mode of the HNB and HeNB of a dual FAP. The first example provides coordination by allowing the two home base stations HNB and HeNB to exchange operation mode information over the internal interface module 28. Both the HeNB and HNB are able to understand messages exchanged over the interface 28. The exchanging of operation mode information between the two home base stations HNB and HeNB, over the internal interface module 28 between the two home base stations, is illustrated by arrows 30 in FIGS. 4a and 4b. Coordination of the entrance into and the exit from the energy saving mode between the two home base stations of the dual FAP is improved, because each home base station may decide to stay in its current mode (energy saving mode or normal mode of operation) or may decide to change its current mode, as a function of at least one of the operation mode information. A second example is described with reference to FIG. 5. When, in S1, a first home base station of a dual FAP is in communication with a user equipment UE and needs to transfer a communication to a second home base station, the first home base station determines, in S2, whether or not the second home base station of the dual FAP is in the energy saving mode.

If the second home base station is not in the energy saving mode, then the first home base station transfers, in S5, the communication. In the case where the first home base station is a HNB and the second base station is a HeNB, the communication transfer may comprise a Communication Redirection message (i.e. a RRC message specified in 3GPP TS 36.331). If the first home base station is a HeNB and the second base station is a HNB, the communication transfer may comprise a Communication Redirection or a Circuit Switch Fall Back (CSFB) message (i.e. a RRC message specified in 3GPP TS 36.331).

If the second home base station is in the energy saving mode, then the exchanging of operation mode information comprises, in S3, the sending of a message by the first home base station to the second home base station. This message triggers, in S4, the exit of the second base station from the energy saving mode and its entrance into a normal operation mode. Once the second home base station is in the normal operation mode, the first home base station can perform, in S5, the communication transfer to the second home base station.

Figure 6:
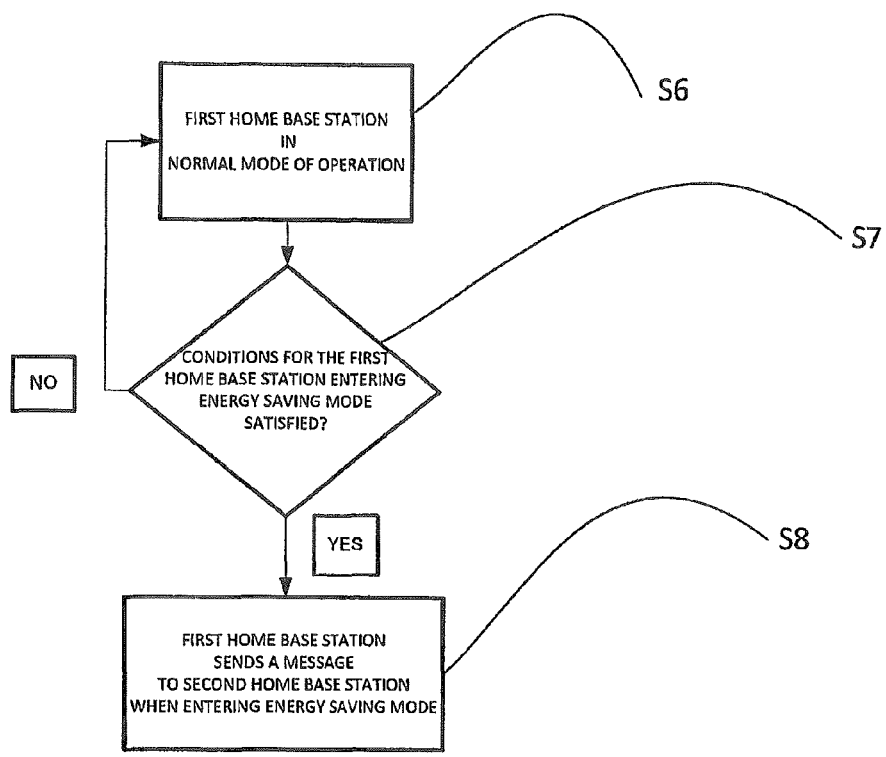
FIG. 6 is a diagram illustrating another an exemplary method performed by the telecommunication system of FIG. 1.

A third example is described with reference to FIG. 6. When a first home base station of a dual FAP is, in S6, in a normal operation mode, it determines, in S7, whether or not the conditions for it to enter the energy saving mode are satisfied. The conditions may comprise, for example, a condition that there has been no UE in the idle or connected state in the dual mode cell for a certain duration of time (as determined, for example, by an Idle Timer of the dual FAP).

If the conditions for entering the energy saving mode are not satisfied, the first home base station stays in the normal mode of operation.

If the conditions for entering the energy saving mode are satisfied, the exchanging of operation mode information, in S8, comprises the sending of a message by the first home base station to the second home base station, when the first home base station enters the energy saving mode.

This exchange of information may further comprise the sending of information about at least one of an energy saving mode timer and an energy saving mode threshold of the first base station.

Coordination of the entrance into and the exit from the energy saving mode between the two home base stations of the dual FAP is improved, because the second home base station may for instance estimate, from the information provided, the time during which the first home base station is going to stay in the energy saving mode. The second home base station may decide to stay in its current mode (energy saving mode or normal mode of operation) or may decide to change its current mode, when the first home base station enters the energy saving mode or at a later given time, as a function of at least one of the message, the energy saving mode timer and the energy saving mode threshold.

Figure 7:
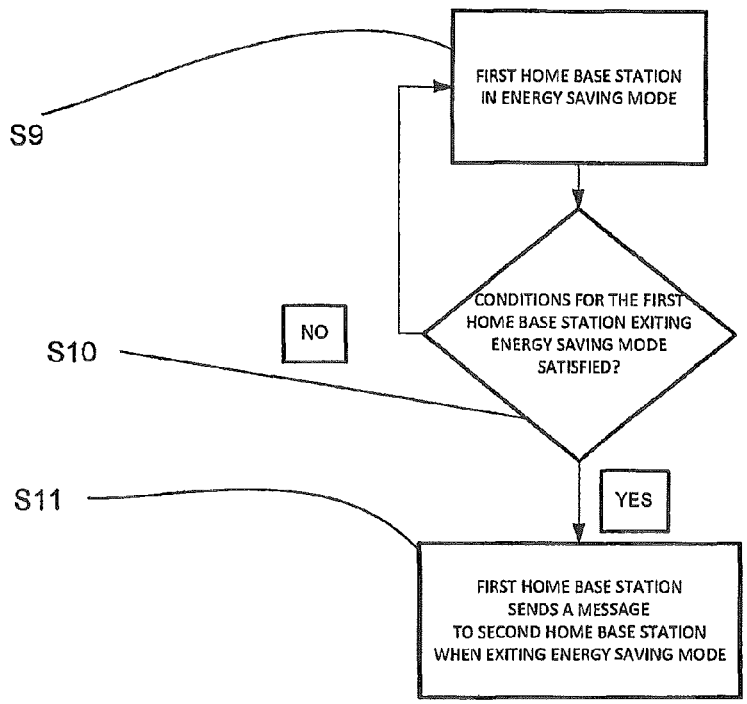
FIG. 7 is a diagram illustrating yet another an exemplary method performed by the telecommunication system of FIG. 1.

A fourth example is described with reference to FIG. 7. When a first home base station of a dual FAP is in S9 in an energy saving mode, it determines in S10 whether or not the conditions for it to exit the energy saving mode are satisfied. The conditions may comprise, for example, a condition that an energy saving mode timer expires and/or a condition that the first home base station receives a paging or any other message on its S1/TR 069 interface and/or a condition that the first home base station detects an uplink transmission from a UE in a neighbouring cell.

If the conditions for exiting the energy saving mode are not satisfied, the first home base station stays in the energy saving mode.

If the conditions for exiting the energy saving mode are satisfied, the exchanging of operation mode information, in S11, comprises the sending of a message by the first home base station to the second home base station when the first home base exits the energy saving mode.

This exchange of information may further comprise the sending of information about at least one of a trigger for exiting the energy saving mode.

Coordination of the entrance into and the exit from the energy saving mode between the two home base stations of the dual FAP is improved. The second home base station may decide, from the information provided, to stay in its current mode (energy saving mode or normal mode of operation) or may decide to change its current mode when the first home base station exits the energy saving mode or at a later given time, as a function of at least one of the message, the trigger and the purpose of the first home base for exiting the energy saving mode.

Modifications and Alternatives

Detailed embodiments have been described above. As those skilled in the art will appreciate, a number of modifications and alternatives can be made to the above embodiments whilst still benefiting from the inventions embodied therein.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the embodiments described above, the mobile telephone and the HNB or HeNB each include transceiver circuitry. Typically this circuitry will be formed by dedicated hardware circuits. However, in some embodiments, part of the transceiver circuitry may be implemented as software run by the corresponding controller.

It should of course be appreciated that, although not explicitly shown in FIGS. 2, 3 and 4a and 4b, the base stations 11 and UEs 3 will have all of the functionality necessary to enable them to operate as base stations and UEs, respectively, in the particular system in which they are designed to function. It should also be appreciated that FIGS. 2, 3 and 4a and 4b are functional block diagrams and that in practice the individual blocks shown in FIGS. 2, 3 and 4a and 4b may exist as discrete elements or their functionality may be distributed or not individually discernible. As an example, the modules 31 to 41 may or may not be separate software modules.

Although the above description of FIGS. 2, 3 and 4a and 4b indicates that the described functionality is provided by software, it should be appreciated that the functionality of a UE or base station may be provided, where appropriate, by hardware, software, firmware or any combination thereof. As an example, the functionality performed by part or all of the above-described software may be performed using one or more dedicated hardware circuits. A software implementation may however be preferred to facilitate the updating of the functionality of a base station 11 or UE 3.

Where software modules are provided, they may be provided, as appropriate, in compiled or un-compiled form and may be supplied to the base station or to the UE, as the case may be, as a signal over a computer or telecommunications network, or on a computer storage medium such as for instance a CD ROM.

Various other modifications will be apparent to those skilled in the art and will not be described in further detail here.

For instance, the base stations of the multimode femto access point might implement any of the example alone or any combination of the examples, depending on the circumstances and the conditions.

Although the invention has been described with particular reference to embodiments comprising communication between the femto cells of a dual FAP internally to the dual FAP using an internal interface, the invention may also be beneficially employed for communication between the femto cells of the dual FAP internally using a shared transfer memory into which the HeNB and HNB may store the operating mode information and from which each of the HeNB and HNB of the dual FAP may retrieve the operating mode information relating to the other base station module of the dual FAP. The shared transfer memory may be part of an Operation Administration and Maintenance (OAM) module. The operating mode information may also be provided to any part of the dual FAP externally to the dual FAP, using an external mechanism, for example, via communication with another communications node such as a Serving GPRS Support Node (SGSN), elsewhere in the communication network, for instance in the core network. The external mechanism may involve for instance a Self Organizing Network (SON) transfer protocol as defined in 3GPP TS 36.413 V10.3.0 and TS 48.018 V10.3.0.

This application is based upon and claims the benefit of priority from United Kingdom patent application No. 1120958.2, filed on Dec. 6, 2011, the disclosure of which is incorporated herein in its entirety by reference.

The invention claimed is:

1. An access point, comprising:
a first home base station module configured to provide wireless connectivity to a communications network to one or more mobile communications devices within a range of the first home base station module, the first home base station module having a normal operating mode and an energy saving operating mode;
a second home base station module configured to provide wireless connectivity to a communications network to one or more mobile communications devices within a range of the second home base station module, the second home base station module having a normal operating mode and an energy saving operating mode; and
an interface configured to couple the first home base station module and the second home base station module,
wherein at least one of the first and second home base station modules is configured to provide operating mode information to an other one of the first and second home base station modules via said interface,
wherein a communication method of the first home base station module and a communication method of the second home base station module are different from each other,
wherein said at least one of the first and second home base station modules is configured to provide the operating mode information to the other one of the first and second home base station modules when an operating mode is switched,
wherein the operating mode information provided by the first and second home base station modules via said interface includes entering into and exiting from the energy saving operating mode, and
wherein the operating mode information, including the entering into and exiting from the energy saving operating mode, is transmitted between the first and second home base station modules via said interface.

2. An access point according to claim 1, wherein the at least one of the first and second home base station modules is configured to inform the other one of the first and second home base station modules when it changes its operating mode.

3. An access point according to claim 1, wherein the at least one of the first and second home base station modules is configured to provide operating mode information to the other one of the first and second home base station modules, to control the operating mode of the other one of the first and second home base station modules.

4. An access point according to claim 1, wherein the at least one of the first and second home base station modules is configured to provide operating mode information to the other one of the first and second home base station modules when the said other one of the first and second home base station modules is in the energy saving operating mode, to trigger the an exit of the said other one of the first and second home base station modules from the energy saving operating mode, and its entrance into the normal operating mode.

5. An access point according to claim 4, wherein the at least one of the first and second home base station modules is configured to provide to the other one of the first and second home base station modules a message comprising at least one of a Circuit Switch Fall Back (CSFB) message or a Communication Redirection message.

6. An access point according to claim 1, wherein the at least one of the first and second home base station modules is configured to provide to the other one of the first and second home base station modules a message comprising information about an energy saving operating mode timer.

7. An access point according to claim 1, wherein the at least one of the first and second home base station modules is configured to provide to the other one of the first and second home base station modules a message comprising information about a trigger for its exit from the energy saving operating mode.

8. An access point according to claim 1, wherein the at least one of the first and second home base station modules is configured to change its operating mode as a function of operating mode information provided by the other one of the first and second home base station modules.

9. An access point according to claim 1, wherein the first home base station module and the second home base station module are mounted within a common housing.

10. An access point according to claim 1, wherein the access point comprises a dual mode femto access point.

11. An access point according to claim 1, wherein at least one of the first and second home base station modules comprises an HNB and the other of the first and second home base station modules comprises an HeNB.

12. An access point according to claim 1, wherein the one or more mobile communications devices and the access point are implemented in a system for use in a telecommunications network.

13. An access point according to claim 1, wherein the at least one of the first and second home base station modules is configured to provide to the other one of the first and second home base station modules a message comprising information about an energy saving operating mode threshold.

14. An access point according to claim 1, wherein, when the at least one of the first and second home base station modules is handed over to the other one of the first and second home base station modules, the at least one of the first and second home base station modules sends an indication to wake up the other one of the first and second home base station modules.

15. An access point according to claim 1, wherein said interface comprises an internal interface located within a common housing on which the first home base station module and the second home base station module are mounted, and
wherein, after a function of at least one of the operation mode information transmitted via said internal interface, each of the first and second home base station modules is configured to decide to stay on or to change from a current mode between the energy saving operating mode and the normal operating mode.

16. A mobile communications device for use with an access point, the mobile communication device comprising:
a first home base station module configured to provide wireless connectivity to a communications network to one or more mobile communications devices within a range of the first home base station module, the first home base station module having a normal operating mode and an energy saving operating mode;
a second home base station module configured to provide wireless connectivity to a communications network to one or more mobile communications devices within a range of the second home base station module, the second home base station module having a normal operating mode and an energy saving operating mode; and
an interface configured to couple the first home base station module and the second home base station module,
wherein each home base station module has a normal operating mode and an energy saving operating mode,
wherein the mobile communications device is arranged to communicate with a communications network via one of the first and second home base station modules of the access point,
wherein a communication method of the first home base station module and a communication method of the second home base station module are different from each other,
wherein said at least one of the first and second home base station modules is configured to provide operating mode information to an other one of the first and second home base station modules when an operating mode is switched,
wherein the operating mode information provided by the first and second home base station modules via said interface includes entering into and exiting from the energy saving operating mode, and
wherein the operating mode information, including the entering into and exiting from the energy saving operating mode, is transmitted between the first and second home base station modules via said interface.

17. A method, performed in a telecommunications network, for facilitating at least one of an entrance into and an exit from an energy saving operating mode of at least one of two home base station modules of an access point, the method comprising:
providing to at least one of said two home base station modules, over an interface coupling the two home base station modules, operating mode information indicating to at least one of said two home base station modules whether an other of said two home base station modules is in the energy saving operating mode or not,
wherein communication methods of the two home base station modules are different from each other,
wherein said at least one of the two home base station modules is configured to provide operating mode information to the other of the two home base station modules when an operating mode is switched,
wherein the operating mode information provided by said at least one of the two home base stations via said interface includes entering into and exiting from the energy saving operating mode, and
wherein the operating mode information, including the entering into and exiting from the energy saving operating mode, is transmitted between the first and second home base station modules via said interface.

18. The method of claim 17, further comprising coordinating said entrance to or exit from said energy saving operating mode by at least one of the two home base station modules in dependence on the provided information.

19. The method of claim 17, wherein, when a second home base station module of the two home base station modules is in the energy saving operating mode and when a first home base station module of the two home base station modules is in communication with a mobile communications device and needs to perform a communication transfer to the second home base station module, the first home base station module sends a message to the second home base station module via the interface, and
wherein said sending of the message triggers an exit of the second home base station module from the energy saving operating mode and its entrance into a normal operating mode, so that the first home base station module can perform the communication transfer to the second home base station module.

20. The method according to claim 19, wherein the first home base station module comprises an HeNB and the second home base station comprises an HNB, and
wherein the communication transfer comprises at least one of a Circuit Switch Fall Back (CSFB) message or a Communication Redirection message.

21. The method according to claim 19, wherein the first home base station module comprises an HNB and the second home base station comprises an HeNB, and
wherein the communication transfer comprises a Communication Redirection message.

22. The method according to claim 17, wherein the first home base station module of the two home base station modules sends a message to the second home base station module of the two home base station modules when the first home base station module enters the energy saving operating mode.

23. The method according to claim 22, wherein the message further comprises information about at least one of an energy saving operating mode timer and an energy saving operating mode threshold of the first home base station module.

24. The method according to claim 22, wherein the second home base station module stays in its current mode when the first home base station module enters the energy saving operating mode, as a function of the message.

25. The method according to claim 22, wherein the second home base station module changes its current mode when the first home base station module enters the energy saving operating mode or at a later given time, as a function of the message.

26. The method according to claim 17, wherein a first home base station module of the two home base station modules sends a message to a second home base station module of the two home base station modules when the first home base station module exits the energy saving operating mode.

27. The method according to claim 26, wherein the message further comprises information about a trigger for the exit from the energy saving operating mode by the first home base station module.

28. The method according to claim 26, wherein the second home base station module stays in its current mode when the first home base station module exits the energy saving operating mode, as a function of the message.

29. The method according to claim 26, wherein the second home base station module changes its current mode when the first home base station module exits the energy saving operating mode or at a later given time, as a function of the message.

30. A non-transitory computer readable medium storing instructions for carrying out a method according to claim 17.

* * * * *